United States Patent [19]
Fosdick

[11] 4,427,343
[45] Jan. 24, 1984

[54] EFFICIENT WIND TURBINE DESIGN FOR LOW VELOCITY AIR FLOW

[76] Inventor: George Fosdick, 14 Wellington Dr., Stony Brook, N.Y. 11790

[21] Appl. No.: 424,743

[22] Filed: Sep. 27, 1982

[51] Int. Cl.³ .............................................. F03D 1/06
[52] U.S. Cl. ................................ 416/200 A; 416/176; 416/237
[58] Field of Search .......... 416/176 A, 200 A, 121 A, 416/237 B

[56] References Cited
U.S. PATENT DOCUMENTS

| | | | |
|---|---|---|---|
| 327,370 | 9/1885 | Williams | 416/237 B |
| 628,497 | 7/1899 | Smith | 416/200 A |
| 1,467,227 | 9/1923 | Capell | 416/237 |
| 1,612,110 | 12/1926 | Funger | 416/237 B |
| 2,619,318 | 11/1952 | Schaer | 416/200 A |
| 2,767,549 | 10/1956 | Martin | 415/DIG. 8 X |
| 3,032,119 | 5/1962 | Hachmann | 416/121 A |
| 4,065,225 | 12/1977 | Allison | 416/121 |
| 4,213,737 | 7/1980 | Gerhardt | 416/237 B X |

*Primary Examiner*—Everette A. Howell, Jr.
*Attorney, Agent, or Firm*—Kevin Redmond

[57] ABSTRACT

Six rows of radial blades, arranged to extend in a spiral (in the direction of axial rotation) covering 55 degrees of arc about a hollow support section, constitute an optimum blade arrangement for maximum efficiency in low velocity airflows. Each blade in the rows is contoured to receive both direct flow pressure as well as airfoil lift in order to provide maximum energy transfers from low velocity airflows.

8 Claims, 8 Drawing Figures

EFFICIENT WIND TURBINE DESIGN FOR LOW VELOCITY AIR FLOW

BACKGROUND

1. Field

This invention relates to wind turbines and, more particularly, to the design of the blade contour and blade position arrangement for optimum efficiency in low velocity air flows.

2. Prior Art

The recent substantial increases in energy costs has prompted the search for efficient energy alternatives to fossil fuels. One alternative which has received widespread attention is the use of wind or air flow energy. Legislation exists in many parts of the country requiring local utilities to accept and pay for inputs from such alternate energy sources, heightening the practicality and interest in implementing this source of renewable energy.

Unfortunately, most wind turbine systems currently available have several principal drawbacks which make them impractical for most localities. The first and most important of these drawbacks is that the typical wind turbine does not operate efficiently unless there is a relatively high wind velocity, often as high as 20 knots. Many areas of the country do not have sustained wind velocities of more than six to ten knots, causing most common wind turbines to provide a poor return on investment.

The second principal drawback is the high noise level produced by most commonly available wind turbines. The blade arrangement of these turbines is usually designed to obtain maximum revolution rate, resulting in a disturbing, audible noise level which varies in intensity and pitch with variations in wind velocity.

The third drawback is the inability of some currently available wind turbines to withstand high velocity winds greater than 40 knots. Unfortunately, velocities well in excess of this occur on occasion in every part of the country.

In the development of the present invention, extensive wind tunnel testing of a number of designs clearly indicated the features which are essential for high efficiency at low wind velocities. As will be apparent, most prior art wind turbines fail to incorporate these necessary features. Characteristics which are detrimental to efficient operation at low wind velocities or to structural integrity at high velocity will be indicated in the following review of a number of prior art devices.

One of the most common prior art windmill blade arrangements is shown in FIGS. 3A and B. This figure shows the blades lying in a single plane, and arranged to cover 360 degrees of arc, causing the blades to completely occupy the frontal area of the rotor. The complete 360 degree frontal coverage in a single plane is clearly shown in FIG. 3A. Experimental research conducted in the development of the present invention has proven that this type of blade arrangement is not the most efficient for low wind velocities. Further losses in efficiency in this design are caused by the extension of blades from the rim 303 completely down to the hub 301. Each blade is positioned directly adjacent to the next and all blades are located between the outer rim 303 and the hub 301.

FIG. 3B shows a break-away view of the blade arrangement in which the rim 303 is removed to expose the blade tips 304. The arrangement of the blades is such that there are no spaces between the blades at any point throughout the 360 degree frontal coverage, a feature which has also been found to adversely affect efficiency.

Another common design is the single propeller blade type (not shown) which has little frontal surface area and as a result is usually unable to turn at all in low velocity air flows. To produce any appreciable power, it must operate in relatively high wind velocities at a high revolution rate which results in an unacceptably high noise level.

In addition to these well known designs, there are other windmill designs available as evidenced by U.S. Pat. Nos. 581,311, 527,866, 969,522, 996,309 and 4,236,866. U.S. Pat. No. 581,311 describes an unusual design in which the axis of rotation of the blades is vertical. The airflow is admitted to a conduit which immediately directs the flow downward to impinge upon a series of blade assemblies. The conduit, in redirecting the flow by ninety degrees, produces an appreciable, initial loss in flow energy prior to reaching the blades. The flow is then passed through a series of identical blade assemblies with each assembly having four blades. These assemblies are cascaded on the same shaft. Each blade assembly covers a frontal arc of 360 degrees, masking the flow to the following blade assemblies. The efficiency of this design can be considered to be low, but this is not unexpected since the stated objective is not efficiency, but rather a low cost device.

U.S. Pat. No. 527,866 shows a design in which several unusually shaped blades extend from the front of the rotor to the rear with each blade masked over 50 percent of its area by another blade. The blades have no intermediate support throughout their span. The only support for the blades is at their ends where they have the narrowest contours and are consequently the weakest. Unfortunately, these characteristics result in a reduction of efficiency and structural strength.

U.S. Pat. No. 969,522 shows a design in which the rotor assembly comprises a single auger shaped blade that must be cocked at an angle which is neither axial nor orthogonal with respect to the rotor axis in order for it to be driven by the airflow. The blade is relatively long and is supported at its ends, making the structure weak and subject to failure. The angle at which the axis is cocked with respect to the airflow results in masking of portions of the blade surface. U.S. Pat. No. 996,309 is similar, using a second auger shaped blade which is intertwined with the first, resulting in greater masking, and is completely without any improvement in the structural strength.

U.S. Pat. No. 4,236,866 is a coaxial turbine system having blades with their longitudinal axis oriented generally parallel to the axis of rotation. There are three concentric sections with each requiring support that complicates the overall mechanism and which requires support arms that mask the flow received by the inner turbine sections.

SUMMARY

It is an object of the present invention to provide a highly efficient wind turbine for airflow velocities as low as six knots.

It is an object of the present invention to provide a highly efficient wind turbine at low velocity airflows that will maintain its efficiency and mechanical integrity at higher airflow velocities.

It is an object of the present invention to produce a wind turbine which provides an efficient energy transfer from the airflow to the rotor at low blade tip velocities.

It is an object of the present invention to provide a wind turbine blade design which obtains blade propulsion from direct airflow pressure as well as from airfoil lift.

In the present invention, a highly efficient conversion of airflow energy at low velocity has been achieved by a special blade arrangement and by specially contoured blades. In an optimum configuration, the blades are arranged in six rows in which each row forms a 24° (nominal) rotational spiral (in the direction of rotation, when viewed from the direction of the wind) about the axis of rotation. The blade rows do not overlap, avoiding the loss due to masking prevalent in many prior art designs. Each blade includes an airfoil surface on its rearward facing side to gain the advantages of both direct pressure and airfoil lift in moving the blade.

DETAILED DESCRIPTION OF THE INVENTION

The invention is described in connection with one environment for illustrative purposes. That environment is a horizontal axis wind turbine operating in a low velocity airflow. It is understood, however, that once the broad principles are understood they may be applied to other environments.

Figure 1:
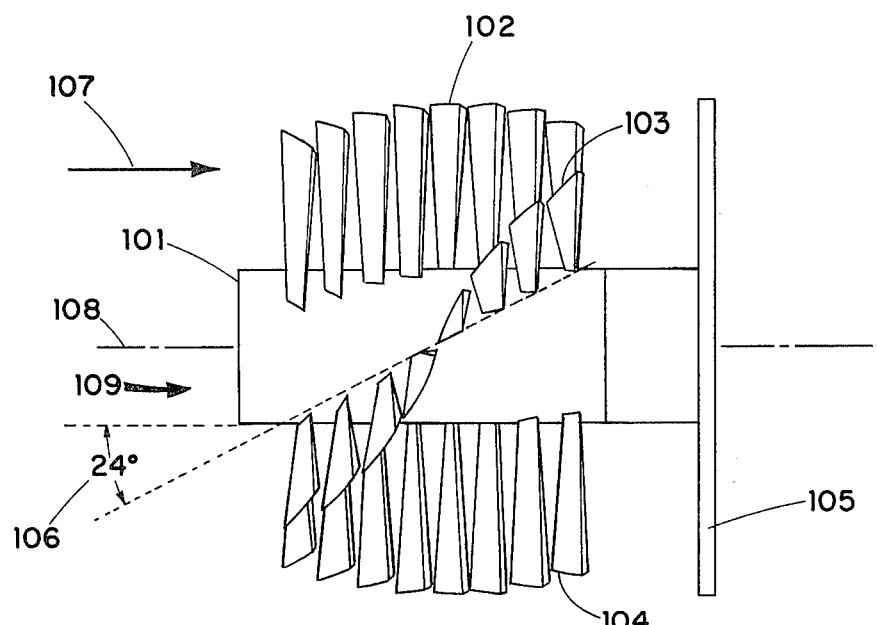
FIG. 1 is a side elevation of a wind turbine rotor embodying the blade arrangement of the present invention.

The fundamental blade arrangement of a preferred embodiment of the present invention is shown in FIG. 1. This Figure shows the invention to comprise a hollow cylindrical blade support mechanism 101, first, second and third helical rows of blades 102, 103 and 104 and a power takeoff mechanism, such as pulley 105.

The blades are attached at one end to the blade support mechanism and extend radially outward therefrom, as well as extend in rows along the surface of the blade support mechanism such as rows 102, 103 and 104. These rows spiral back in a rotational direction from the front 109 of the rotor, forming an angle with the axis of rotation 108 of 24±5 degrees for a six row device. Six rows have been found to be optimum, but four or five rows provide satisfactory performance. The nominal angle of a row with respect to the axis of rotation remains 24 degrees irrespective of the number of rows; however, the smaller the number of rows, the greater the depth of the cylindrical support mechanism (depth being the distance from the leading to the trailing edge of the cylinder), but the nominal diameter of the cylindrical support mechanism remains one-third of the wind turbine diameter as measured from diametrically opposed blade tip to blade tip. A practical embodiment may include 20 blades in a row. Only three rows are shown in FIG. 1 for clarity, however, the general spiral configuration of the rows is evident.

The wind direction for normal operation is directed at the front of the rotor 109 and parallel to the axis of rotation, as shown by the wind direction arrow 107. The airflow about the axis 108 is free to pass in a relatively unrestricted manner through the cylindrical support mechanism 101. This is opposed to many prior art designs which have the blades extending inward virtually to the axis of rotation. In order for the blades to extend inward in this manner, they must either overlay one another or taper sharply. Where there is extensive overlay, masking and eddy currents occur, greatly reducing efficiency. Where there is a sharp taper, there is little blade surface area and the structure is weakened. This later construction has the dual disadvantage of poor efficiency and low strength. On the other hand, the present invention offers little resistance to the airflow in this area and permits the use of a relatively wide blade base to securely mount the blades without any loss in efficiency.

Figure 2:
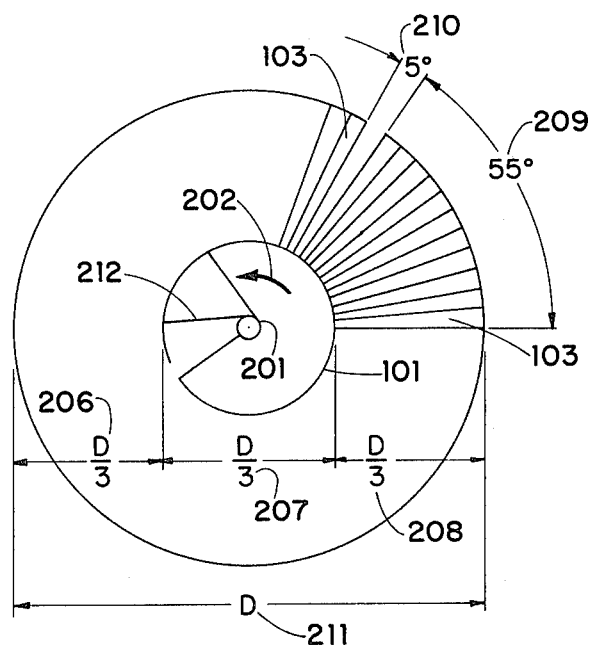
FIG. 2 is a front elevation view of the device of FIG. 1.
Figure 3A:
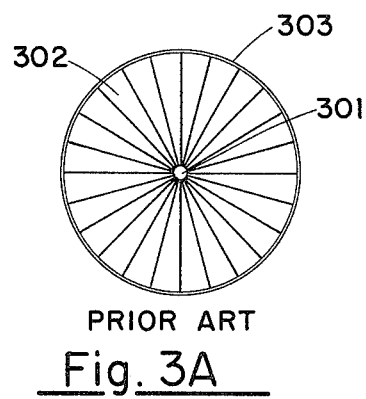
FIG. 3A is a front elevation view of a prior art wind turbine rotor.
Figure 3B:
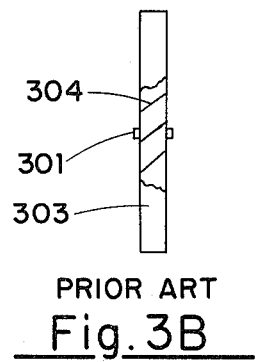
FIG. 3B is a side elevation view of the device of FIG. 3A.

FIG. 2 is a front elevation view of the invention, showing a first row of blades 103 and a portion of a second row 102. The remaining rows are similar and are not shown for clarity. The cylindrical support 101 is itself supported by spokes 212 which extend radially from a hub 201. The spokes 212 are designed to have a relatively small frontal cross section to reduce drag and provide for an essentially unresisted flow through the cylindrical support mechanism. Each row of helical blades occupies a nominal arc of 55 degrees (drawing numeral 209). Between rows, there is a nominal spacing of 5 degrees (drawing numeral 210). Where 5 rows are used, the nominal frontal arc is 67 degrees and the nominal spacing between rows is 5 degrees.

The relative dimensions of the blade and the cylindrical support mechanism can be seen in FIG. 2. The overall diameter D of the rotor from blade tip to blade tip is designated by drawing numeral 211. The blade lengths 206 and 208 as well as the diameter of the cylindrical support mechanism are each nominally one-third of the overall diameter, D. This arrangement provides a relatively large circumferential area about the cylindrical support mechanism on which to mount the blades and eliminates the masking, eddy currents and weakened structures encountered in prior art devices which use the hub for mounting the blades.

Figure 4A:
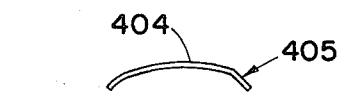
FIG. 4A is a cross sectional view of a rotor blade of the present invention.
Figure 4B:
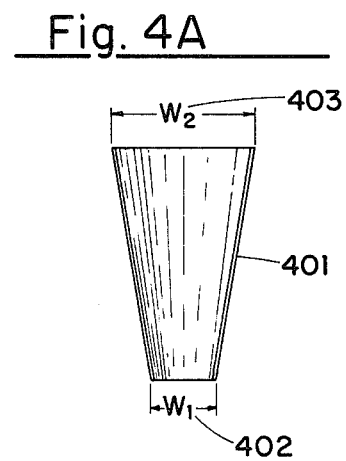
FIG. 4B is a front elevation view of a blade of the present invention.

The blade arrangement described above is important in providing high efficiency at low velocity, but the blade itself is equally important in obtaining this efficiency. A plan or edge view of a blade is shown in FIG. 4A while a frontal elevation view is shown in FIG. 4B. It can be seen from FIG. 4A that the rear face 404 of the blade 405 has curved, convex or airfoil shaped contour which provides a "pulling" or lifting effect from the rear of the blade in addition to the normal direct pressure or "push" effect on the frontal area or forward concave face of the blade, thereby increasing the effective force delivered to the blade by a passing airflow.

In the frontal view of the blade shown in FIG. 4B, it can be seen that the blades taper from a wide width W2 at their top to a narrower width W1 at their bottom.

The ratio of W2 to W1 is nominally 3 to 1 and the typical dimensions in a preferred embodiment are 3 inches and 1 inch respectively (of forward projection), making the mean width 2 inches. The taper reduces masking at the bottom, while still providing a useful surface from which both the push and pull effect efficiently extract energy from the airflow.

Figure 5:
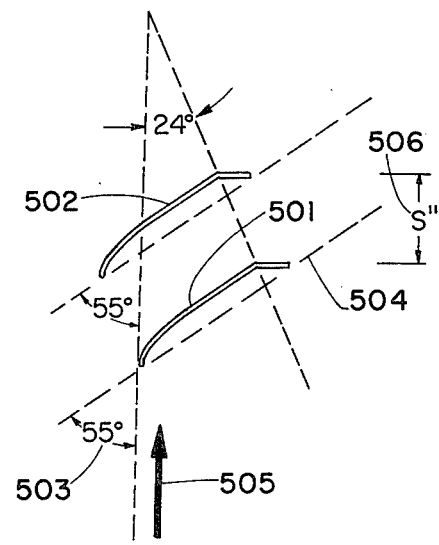
FIG. 5 is a cross sectional view of two blades of the present invention, illustrating their orientation and spacing with respect to the wind direction.

FIG. 5 illustrates the relative positions and spacing between two blades when mounted on the cylindrical support mechanism. Blades 501 and 502 are seen in plan view to be separated by a distance S 506. This distance is typically equal to the mean frontal width or 2 inches in the example above. The chordal datum line (a straight line drawn from the leading edge to the trailing edge) of each blade is set at an angle 503 of nominally 55 degrees with respect to the rotor axis which is usually parallel to the wind direction 505, thus the trailing edge surface of each blade is nominally orthogonal to the direction of the wind. Note that the blade angle when measured with respect to the wind direction (which is the reference used for the row angle) is the supplement of 55° or 125°. That is, the difference between the row angle and the blade angle is 101° (180°-55°-24°).

The blade arrangement and blade configuration described above provide efficient operation at low wind velocities and at correspondingly low rotor speeds. The low rotor speed results in a low blade tip speed and thus an appreciably reduced noise level as compared to high velocity prior art devices.

Various modifications may be made without departing from the spirit and scope of the present invention. For example, all dimensions and ratios are assumed to have a tolerance about the nominal value of at least ±10 percent and the row and blade angles have a tolerance of at least ±5 degrees. These nominal values, when stated, are intended to include such tolerances. The invention, therefore, should be limited only by the scope of the following claims.

Figure 6:
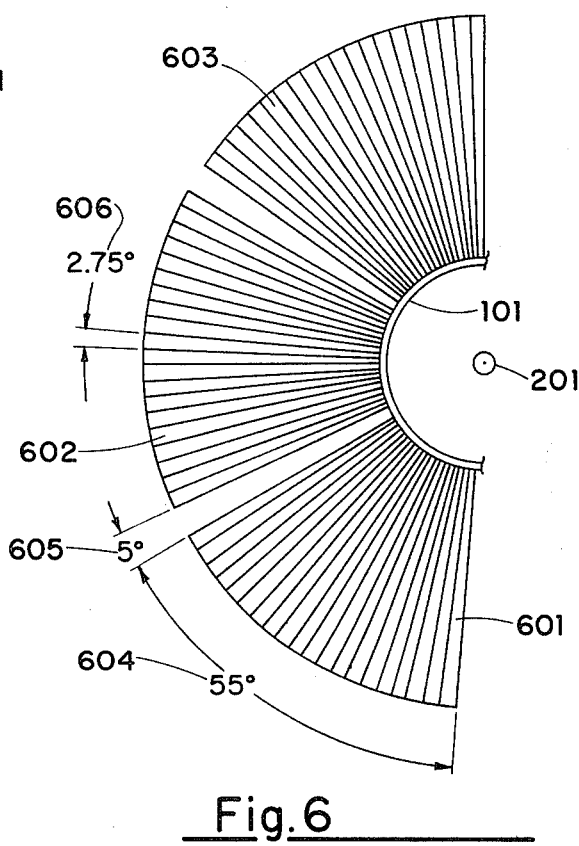
FIG. 6 is a front elevation view of a 120 blade version.

Another variation within the scope of the invention becomes evident as the wind turbine structure becomes larger. FIG. 6 is a partial front elevation view of a larger turbine having six rows of blades with twenty blades in each row; however, only three rows 601–603 are shown in this partial view. All the blades are mounted about the cylindrical support mechanism 101 which is positioned concentrically about hub 201 in a manner similar to that shown in FIG. 2. Each row occupies a radial arc of 55 degrees (604) with a spacing of 5 degrees (605) between rows and advances helically on a 24 degree angle with the axis of rotation. Unlike FIG. 2, where there are only six blades in each row, there are twenty in FIG. 6, resulting in an angular spacing between the leading edges of the blades of only 2.75 degrees (606). It should be realized that the 2.75 degrees is a function of the diameter and will change with changes in the diameter.

Since the diameter of the cylindrical support mechanism remains equal to one-third of the blade-tip to blade-tip diameter, a large turbine will require a proportionately large diameter for the support mechanism. As the diameter of the support mechanism is increased, its circumference and the distance along an arc of say 55 degrees (covered by a row of blades) is increased proportionately, but the mean typical blade width remains at approximately two inches, requiring the proportionately larger number of blades shown in FIG. 6. Although the configuration of FIG. 6 may give the initial impression of being of a different design, it can be seen from the above discussion that this configuration with its large number of blades remains within the design criteria of the present invention.

Having described my invention, I claim:

1. A wind turbine of the type having a hub aligned and arranged to rotate about a horizontal axis, the turbine having a forward and a rear face with the forward face being at the hub terminal which is directed into the wind during normal operation of the turbine, wherein the invention comprises:
    (a) a cylindrical member positioned concentrically about but spaced apart from the hub, the diameter of the cylindrical member being nominally one-third the overall rotor diameter as measured from diametrically opposite blade tip to blade tip,
    (b) mounting means for supporting and connecting the cylindrical member to the hub, said mounting means oriented and arranged to permit the flow of air through the cylindrical means, and
    (c) a plurality of blades that originate at and are mounted to the outside surface of the cylindrical member and extend radially therefrom, the blades being arranged in a plurality of rows exceeding four but less than ten in number with each row comprising a plurality of blades exceeding 20 in number, and each row extending spirally about the cylindrical member, winding in the direction of normal rotation of the wind turbine in traversing the cylindrical member from forward to rear, each of the blades having a mean width and the blades being nominally separated in the axial direction of the cylindrical member by their mean width, the rows of blades providing frontal coverage of 300 to 360 degrees without overlap of the rows with each row being oriented to form an angle of nominally 24 degrees with the axis of rotation, the rows of blades being evenly distributed around the cylindrical member, and the angle of nominally 24 degrees, the 300 to 360 degree coverage, the number of blades and their spacing causing the cylindrical member to have a length in its axial direction exceeding twenty-five percent of the diameter from diametrically opposed blade tip to blade tip.

2. A wind turbine as claimed in claim 1, wherein there are six rows of blades evenly distributed about the cylindrical member.

3. A wind turbine as claimed in claim 1, wherein there are 5 rows of blades.

4. A wind turbine as claimed in claim 1, wherein the blades have a tip at their outer most radial edge and a base at their innermost radial edge, said blades being wider at their tips than at their base by a nominal ratio of three to one.

5. A wind turbine as claimed in claim 3, wherein the blades have a forward and rear face coinciding with the forward and rear face of the turbine, said blades being cambered in a cross section taken orthogonally with respect to their longitudinal axis which coincides with their radial axis, the cambered being such as to make its rear face convex and its forward face concave and this cambered cross section on the rear of the blade when mounted on the cylindrical member to form an airfoil to produce lift on its rear convex face while receiving direct air pressure on its forward concave face.

6. The wind turbine as claimed in claim 5, wherein the chords of the blades are oriented at a nominal angle of 55 degrees with respect to the axis of rotation.

7. A wind turbine as claimed in claim 5, wherein the trailing edge of each of the blades when viewed in cross section orthogonal to its radial axis is parallel to the direction of blade rotation and generally orthogonal to the direction of the wind.

8. A wind turbine as claimed in claim 7, wherein the trailing edge is nominally twenty-five percent of the blade's frontal projection.

* * * * *